United States Patent
Wigro et al.

(10) Patent No.: US 12,549,207 B2
(45) Date of Patent: Feb. 10, 2026

(54) METHOD AND DEVICE FOR PROTECTING A SIGNAL FOR TRANSMITTING A MEASUREMENT VALUE TO A SIGNAL PROCESSING UNIT

(71) Applicant: Robert Bosch GmbH, Stuttgart (DE)

(72) Inventors: Benno Wigro, Stuttgart (DE); Volker Frese, Beilstein (DE)

(73) Assignee: ROBERT BOSCH GMBH, Stuttgart (DE)

(*) Notice: Subject to any disclaimer, the term of this patent is extended or adjusted under 35 U.S.C. 154(b) by 475 days.

(21) Appl. No.: 18/250,806

(22) PCT Filed: Dec. 1, 2021

(86) PCT No.: PCT/EP2021/083797
§ 371 (c)(1),
(2) Date: Apr. 27, 2023

(87) PCT Pub. No.: WO2022/117660
PCT Pub. Date: Jun. 9, 2022

(65) Prior Publication Data
US 2023/0396275 A1 Dec. 7, 2023

(30) Foreign Application Priority Data
Dec. 3, 2020 (DE) .................. 10 2020 215 317.5

(51) Int. Cl.
*H04B 1/04* (2006.01)
*G08C 25/04* (2006.01)

(52) U.S. Cl.
CPC .......... *H04B 1/0466* (2013.01); *G08C 25/04* (2013.01)

(58) Field of Classification Search
CPC .............................. H04B 1/0466; G08C 25/04
See application file for complete search history.

(56) References Cited

FOREIGN PATENT DOCUMENTS

| | | | |
|---|---|---|---|
| DE | 102014003776 A1 | 9/2015 | |
| EP | 2755045 A1 * | 7/2014 | .......... G01S 13/931 |
| JP | 2002084247 A | 3/2002 | |
| WO | 2015197201 A1 | 12/2015 | |
| WO | 2019230784 A1 | 12/2019 | |

OTHER PUBLICATIONS

International Search Report for PCT/EP2021/083797, Issued Apr. 21, 2022.

* cited by examiner

*Primary Examiner* — Elton Williams
(74) *Attorney, Agent, or Firm* — NORTON ROSE FULBRIGHT US LLP

(57) ABSTRACT

A method for protecting a signal for transmitting a sequence of measurement values to a signal processing unit. The method includes a step of reading in at least one sequence of measurement values from a sensor and a step of processing the measurement values using a cyclical processing specification in order to determine a varied measurement value for each of at least two measurement values. Finally, the method comprises a step of sending the varied measurement values to the signal processing unit as measurement values from the sensor.

10 Claims, 3 Drawing Sheets

METHOD AND DEVICE FOR PROTECTING A SIGNAL FOR TRANSMITTING A MEASUREMENT VALUE TO A SIGNAL PROCESSING UNIT

FIELD

The present invention is based on a device or method for protecting a signal for transmitting a measurement value to a signal processing unit. The present invention also relates to a computer program.

BACKGROUND INFORMATION

In the new generation of inertial sensors, the data width of the sensor signals has been extended to 32 bits. If, by way of example, it is then considered that, for example, an accelerometer has a total offset error of approx. 50 mg and a total range of 5 g in both directions, the resolution required is 200. This would then be 8 bits. If it is also considered that another tolerance value is added because the relative error in a measurement for the same part is only approx. 5 mg, a quantity of information, or an increase in the quantity of information by a factor of 2000, is obtained, and this is represented by a binary representation of a data word of this kind having a width of 11 bits. In angular rate sensors, these correlations are similar; noise will be lessened.

Modern sensors usually have a small arithmetic logic unit integrated therein which performs signal processing functions such as filtering and alignment with calibration values. As part of reducing the integrated components in size, these elements also operate at considerably lower voltages than the voltages required for measuring or transmitting the signals (e.g., modern cores, 0.9 V; communication voltages, 2.5-5 V; acceleration voltages for micromechanical elements, >5 V). These components are also very sensitive because they are small. Therefore, a line error, whether on the printed circuit board or in the chip itself, which brings about incorrect voltages and thus also excessively high voltages on the components, results in destruction of these components. In the worst case, the signals are then distorted and, in the simplest case, the core simply stops.

To make it possible to infect an error of this kind, up to now it has been proposed to increase the resolution of the measurement values and thus, once the resolution is sufficiently high, to identify a noise in the transmitted measurement values which indicates that the measurement values correspond to physical variables actually measured by the sensors. However, the drawback of an approach of this kind is that the bandwidths required for transmitting measurement values having such a high resolution very quickly result in high demand on the transmission capacity for the measurement values.

SUMMARY

By way of the approach presented here, a method of the present invention, a device using the method of the present invention, and a corresponding computer program according to the present invention are provided. Advantageous developments and enhancements to the device and method are possible using the measures disclosed herein.

The approach presented here presents a method for protecting a signal for transmitting a measurement value to a signal processing unit. According to an example embodiment of the present invention, the method comprises the following steps:

reading in at least one sequence of measurement values from a sensor;

processing the measurement values using a cyclical processing specification in order to determine a varied measurement value for each of at least two measurement values; and sending the varied measurement values (for example as measurement values from the sensor) to the signal processing unit.

A "sequence of measurement values from a sensor" can for example be understood to be a series of measurement values which correspond to consecutive or successive physical variables which are captured by the sensor in question. A "cyclical processing specification" can be understood to be a processing specification using which actions, which are predetermined in fixed time intervals, are performed on the measurement values and a corresponding measurement value is modified in accordance with a predefined modification specification.

The approach presented is based on the knowledge that now, for identifying an error such as defective line insulation (for example caused by a "stuck-at" error), a resolution of the measurement values does not need to be increased, but instead, by actively varying the measurement values, an error can also be detected in the processing or transmission of these measurement values if it is known how this active variation of the measurement values is carried out before sending. In this way, only the processing specification used also needs to be known in a receiving unit, such that it can then be ascertained from the received signals or measurement values whether these received signals or measurement values have been processed using the corresponding processing specification before they were sent for transmission. The great advantage of an approach of the present invention is the ability to detect error-free transmission by a small variation in the content of the measurement value, it being possible to dispense with a significant increase in the resolution of the measurement values in order to identify a variation of this kind using a noise in the capture of the measurement values, for example. In this way, available transmission capacities can be utilized very efficiently, and therefore, for example, more cost-effective transmission modules and/or rapid transmission of measurement value data can be made possible.

A specific example embodiment of the approach according to the present invention is also advantageous in which, in the processing step, a processing specification is used which is configured to bring about an algebraic and/or logical link between the measurement value and/or a digital representation of the measurement value and a predefined link value in order to determine the varied measurement values. A "predefined link value" can, for example, be understood to be a parameter such as a number or a bit which is linked to the measurement value. In this case, an "algebraic and/or logical link" of the measurement value can, for example, be understood to be addition or subtraction of this number corresponding to the link value to or from the measurement value or a shift in the measurement value by a bit corresponding to the link value. The advantage of an approach of this kind is the ability to vary the measurement value very simply in a reconstructable manner by way of a numerical and/or circuitry-based configuration, such that this variation can also be identified on a receiving side in a simple and robust manner.

A specific example embodiment of the present invention is also advantageous in which, in the processing step, a processing specification is used which is configured to add a measurement value to the link value in order to determine a corresponding varied measurement value. The advantage of this kind of specific embodiment is that the link value can be added to the measurement value in a technically very simple manner numerically and/or through circuitry.

A specific example embodiment of the present invention is also particularly advantageous in which, in the processing step, a processing specification is used which is configured to modify a lowest-value digit of a measurement value in order to obtain a corresponding varied measurement value. The advantage of this kind of specific embodiment of the approach proposed here is that, by modifying the lowest digit of a measurement value, the active modification of the measurement value has the least possible effect, and therefore there should be the least possible intervention in the information content of the signals to be transmitted.

A specific example embodiment of the present invention is also very efficient in which, in the processing step, a processing specification is used which is configured to alternately link measurement values to a first predefined link value and a second predefined link value that differs from the first link value in order to determine the varied measurement values. The advantage of this kind of specific embodiment is the ability to detect a greater number of error types by using different measurement values, such that the error detection capability of the approach proposed here can be enhanced even further.

A specific embodiment of the present invention is particularly advantageous in which, in the processing step, a processing specification is used which is configured to use a value that forms a value complementary to the first link value as the second predefined link value. A "complementary value" can, for example, be understood to mean a value which modifies a measurement value in such a way that a modification obtained by linking to the first link value would be undone by the second link value. For example, in a processing specification, the value of 1 is selected as the first link value as an addition, whereas a value of −1 is used as the second predefined link value, such that, when the first link value is added to the measurement value, the measurement value itself would thus also be obtained again with the second link value. The advantage of this kind of specific embodiment of the approach proposed here is the ability to compensate for the effect of the individual link values on the respective measurement values by temporally spreading out targeted modifications to the different measurement values in the total, i.e., in an averaging operation, such that, for example, an active evaluation or correction of the data in the received signal would no longer be necessary in the event of such an averaging operation over a plurality of time intervals. In this way, on a receiving side, the processing of the measurement values can be significantly simplified while still obtaining the above-mentioned advantages.

A specific embodiment of the present invention can be particularly advantageously used when, in the processing step, a processing specification is used which is configured to apply the cyclical processing specification when the measurement values of the sequence of measurement values within a predefined time interval are identical. The advantage of this kind of specific embodiment of the approach proposed here is that measurement values are varied only when these measurement values are identical over a prolonged time period, such that, for example, active "distortion" of the measurement values for error detection can remain an exception as far as possible.

A specific embodiment of the present invention is also possible in which, in the processing step, a processing specification is used which is configured to perform the processing cyclically using the processing specification for measurement values that are read in at a predefined time interval from one another in order to obtain one corresponding varied measurement value in each case. The advantage of this kind of specific embodiment is the ability to utilize a further variable by way of the known predefined time interval in which measurement values are modified in order to detect an error in the measurement values.

According to the present invention, a specific embodiment is also provided as a method for detecting an error in the transmission of a signal containing measurement values to a signal processing unit, wherein the method comprises the following steps:

reading in a sequence of measurement values from the signal;

analyzing whether the measurement values have a cyclical pattern as obtained by applying a read in processing specification to measurement values from a sensor, and ascertaining the error in the transmission of the signal containing measurement values if it is not detected in the analyzing step that the transmission signal containing measurement values has the cyclical pattern.

An advantage of this kind of specific embodiment of the present invention is the ability to identify the modifications made in the transmission signal before sending the measurement values by way of the knowledge of the processing specification and thus to establish whether an error has arisen in the transmission of the transmission signal. In this case, the processing specification that has already been discussed in the preceding paragraphs can advantageously correspond to this processing specification, and therefore the specific embodiment as a method for detecting an error in the transmission of a transmission signal containing measurement values can be understood to be a corresponding procedure on the receiving side.

The present invention further provides a device which is configured to carry out, actuate, or implement the steps of a variant of at least one of the methods presented here in corresponding apparatuses. The object of the present invention can also be achieved quickly and efficiently using this variant of the present invention in the form of a device.

For this purpose, according to an example embodiment of the present invention, the device may comprise at least one arithmetic logic unit for processing signals or data, at least one storage unit for storing signals or data, at least one interface to a sensor or to an actuator for reading in sensor signals from the sensor or for outputting data or control signals to the actuator, and/or at least one communication interface for reading in or outputting data embedded in a communication protocol. The arithmetic logic unit may, for example, be a signal processor, a microcontroller, or the like, wherein the storage unit may, for example, be a flash memory, an EEPROM, or a magnetic storage unit. The communication interface can be configured to read in or output data in a wireless and/or wired manner, wherein a communication interface that can read in or output wired data can, for example, read in said data electrically or optically from a corresponding data transmission line or output it into a corresponding data transmission line.

In the present case, a device can be understood to mean an electrical instrument that processes sensor signals and outputs control and/or data signals on that basis. The device can comprise an interface, which may be configured as hardware and/or software. When configured as hardware, the interfaces may, for example, be part of a system ASIC that includes a wide range of functions of the device.

However, the interfaces may also be separate, integrated circuits or consist at least in part of discrete components. When configured as software, the interfaces may be software modules that are provided on a microcontroller in addition to other software modules, for example.

Also advantageous according to an example embodiment of the present invention is a computer program product or computer program comprising program code which can be stored on a machine-readable carrier or storage medium, such as a semiconductor memory, a hard-disk memory, or an optical memory, and is used for carrying out, implementing, and/or actuating the steps of the method according to one of the above-described specific embodiments, in particular if the program product or program is executed on a computer or a device.

Exemplary embodiments of the present invention are shown in the figures and explained in greater detail in the following description.

DETAILED DESCRIPTION OF EXAMPLE EMBODIMENT

Figure 1:
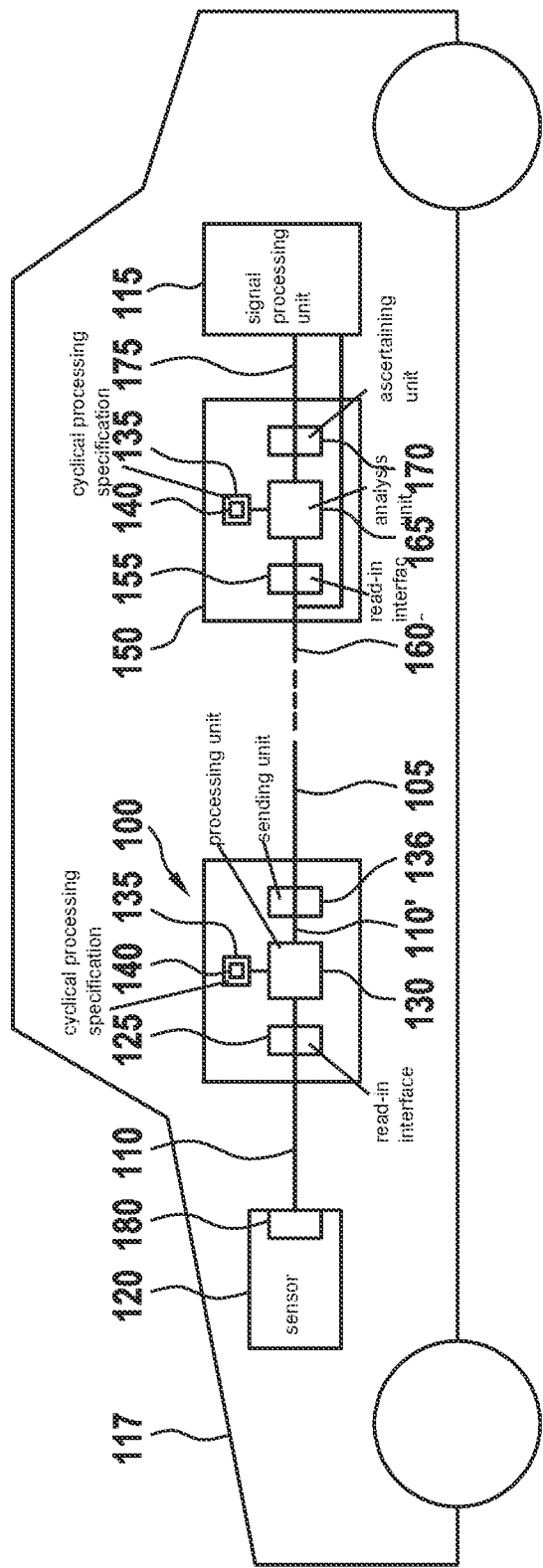
FIG. 1 is a block diagram of a device for protecting a signal for transmitting a sequence of measurement values to a signal processing unit for use in a vehicle.

In the following description of advantageous exemplary embodiments of the present invention, elements shown in the various figures that have a similar action are given the same or similar reference numerals and these elements are not described again.

FIG. 1 is a block diagram of a device 100 for protecting a signal 105 for transmitting a sequence of measurement values 110 to a signal processing unit 115 for use in a vehicle 117. In this case, the sequence of measurement values 110 is provided by a sensor 120, for example, and represents a physical variable which the sensor 120 captures in predefined time steps and outputs as the measurement values 110. For example, the sensor 120 can be configured to capture an angular rate or acceleration at a point in a vehicle 117 and to output accordingly associated measurement values 110. The measurement values 110 are read in into the device 100 by a read-in interface 125 and are processed in a processing unit 130 using a cyclical processing specification 135 in order to determine a varied measurement value 110' for each of at least two measurement values 110. These varied measurement values 110' are then transmitted to the signal processing unit 115 in the signal 105 via a sending unit 136 (for example together with further measurement values 110 and/or in a particular data format). The signal processing unit 115 can, for example, prepare the measurement values for a driver assistance system or a trigger device for safety means in a vehicle 117, but this is not shown in greater detail in FIG. 1 for the sake of clarity.

To then obtain the varied measurement values 110', as described above, the read in measurement values 110 or at least two of the read in measurement values 110 are processed in the processing unit 130 in accordance with the cyclical processing specification 135. This cyclical processing specification 135 is, for example, configured such that measurement values 110 that are at a predetermined time interval from one another are linked by a predefined link value 140. For example, a link value 140 of this kind may be a predefined value that is added to the measurement values 110 to obtain the varied measurement values 110'. In this way, the measurement values 110 in question are deliberately "distorted" in a conventional manner in a predetermined time interval and are output in the signal 105 as the varied measurement values 110'.

If it is now detected that the varied measurement values 110' contained in the signal 105 have actually been varied in accordance with the processing specification 135, a device 150 for detecting an error in the transmission of a signal 105 containing measurement values 110 is then provided on the receiving side of the signal 105. In this device 150, the signal 105, which comprises a sequence of received values 160 representing the varied measurement values 110', is first read in via a read-in interface 155. These received values 160 are then supplied to an analysis unit 165, which can in turn access the corresponding cyclical processing specification 135 and the link value 140 from a memory in order to check whether the received values 160 have been processed in accordance with the cyclical processing specification 135 and the link value 140. The same processing specification 135 and the same link value 140 are thus advantageously known both in the device 100 and the device 150. Furthermore, information regarding the analysis result in the analysis unit 165 is relayed to an ascertaining unit 170 in which an error is ascertained and is sent to the signal processing unit 115 via an error signal 175 when the analysis unit 162 does not detect that the signal 105 containing received values 160 has the cyclical pattern as obtained by applying the processing specification 135 to measurement values 110 from the sensor 120. In this way, the signal processing unit 115 can thus indicate that the received values 160 from the signal 105 are not valid and thus cannot be used as a basis for further functions.

Using the approach presented here, it is therefore possible to ascertain a loss of the function of the sensor 120 or of the validity of the measurement values 110. Here, these measurement values 110 may be in digital form, for example in a transmission format of a data frame having a header and an operand, which is also configured to transmit a plurality of data words, for example. In certain situations, an error can namely arise that means that a digital part 180 of the sensor 120 is no longer functioning correctly and is outputting static values as the measurement values 110, which are then interpreted in the signal processing unit 115 as valid measurement values and are used for actuating functions.

As already briefly mentioned above, the above-mentioned problem can be solved by increasing the resolution of the measurement values 110, for example from 16 bits to 32 bits, such that, when a digital part 180 of the sensor 120 is operating correctly, a noise, which would have to be detected in the measurement values 115 due to the increased resolution, can be expected when the sensor captures the physical variable. Although this procedure is possible in principle, it requires a dramatically increased capacity for the transmission of the measurement values at the accordingly increased resolution in order to be able to detect certain errors on its own. At this point approach proposed here by linking the measurement values in a cyclical manner, i.e., at certain intervals, to certain predefined link parameters, such that, on the basis of the presence of these modified measurement values, it can then also be detected whether the digital part 180 of the sensor 120 is functioning correctly. For this purpose, the device 100 can for example also be understood to be an extension of the digital part 180 of the sensor 120 such that the signal 105 can be transmitted for example via standard data transmission paths in a vehicle 117, such as the CAN bus. Upstream of the signal processing unit 115, the device 150 can then in turn ascertain whether the received values 160 contained in the signal 105 correspond to correct measurement values 110.

Figure 2A:
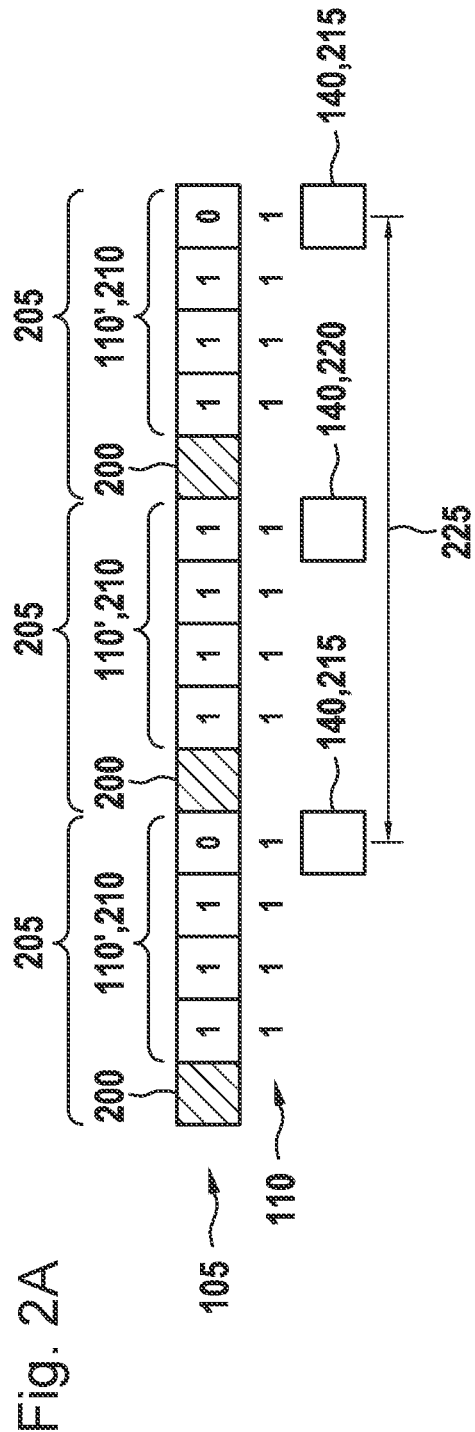
FIGS. 2A and 2B show two diagrams, each representing the content of the signal as output by the sending unit, for example.
Figure 2B:
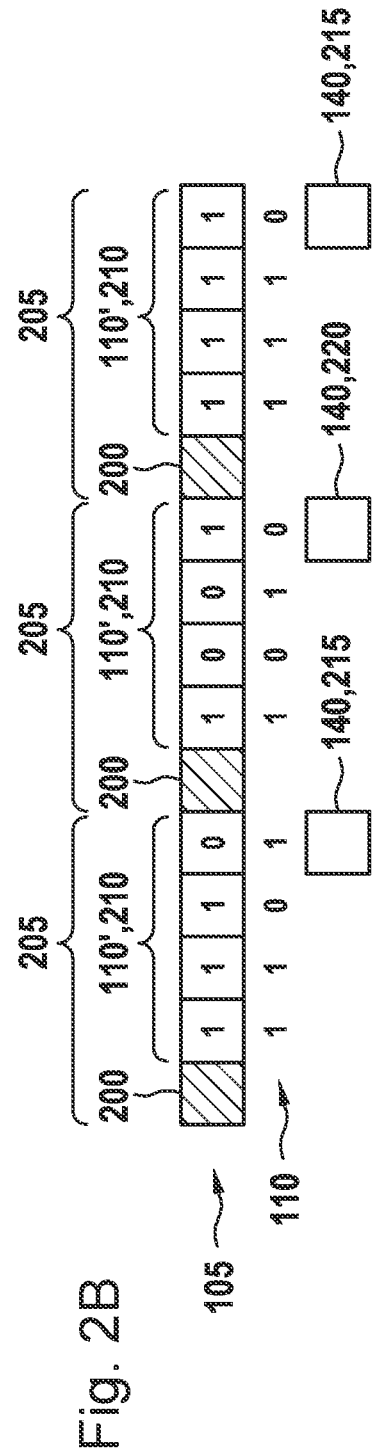

FIGS. 2A and 2B shows two diagrams representing the content of a signal 105 as output by the sending unit 136, for example. Here, the signal 105 is output as a sequence of data words in which a header 200 first introduces a data word 205 of this kind, and a data field 210 then adjoins the header 200. The varied measurement values 110' are then contained in the data fields 210, for example, and can be transmitted to the device 150 or the signal processing unit 115.

FIG. 2A shows a first exemplary embodiment of how a sequence of measurement values 110 is processed to form varied measurement values 110' in the processing unit 130 by the corresponding processing specification 135 and prepared for transmission in the signal 105. By way of example, in this case it is assumed that the digital part 180 of the sensor 120 from FIG. 1 outputs a 4-bit-wide static measurement value 110 in the form 1111, which is caused by a "stuck-at-high" error, however, and thus needs to be marked as defective and cannot be utilized in the signal processing unit 115. Since, for example, it then cannot be detected in the signal processing unit 115 that this measurement value 110 or a corresponding sequence of measurement values 110 in the above-mentioned form is defective, then, in accordance with the view from FIG. 1, the device 100 processes at least two of the measurement values 110 to form varied measurement values 110' by way of the processing unit 130 in accordance with the processing specification 135 and inserts them into a corresponding data field 210 of a data word 205. For example, this processing specification 135 can provide that the measurement value 110 is alternately linked to a first link parameter 215 as a (first) link value 140, thereby resulting, for example, in a varied measurement value 110' in the form 1110, which is therefore entered in the data field 210 of the first data word 205. This means that the lowest-value digit of the measurement value 110 present here as a binary datum is modified from a value 1 to the value 0. For example, the first link value thus corresponds to a subtraction of the lowest value, which can then be represented by the 4-bit-wide measurement value 110. Furthermore, a subsequent measurement value 110 can be linked to a second link parameter 220 as a (second) link value 140 by way of the processing unit 130 in accordance with the processing specification 135, such that the content of the measurement value 110 is modified and this measurement value 110 is entered in the data field 210 of the second data word 205 as a "varied" measurement value 110' in the form 1111. For another subsequent measurement value 110, a procedure for a varied measurement value 110' can then be carried out again analogously to the procedure for the first data word 205 in the processing unit 130 in accordance with the processing specification 135, such that, in this case, a varied measurement value 110' in the form 1110 is obtained in turn, which is then entered in the data field 210 of the third data word 205. It is then apparent that, despite the adjoining static measurement values 110 in the form 1111, data words 205 of which the content of the data fields varies cyclically are transmitted in the signal 105 such that, due to the knowledge of the corresponding processing specification 135 and the link parameter 140 used in each case, it is possible in a very simple manner to identify, in the device 150 in the analysis unit 165, if an error of the kind mentioned above has arisen and to prevent the transmitted measurement values 110 from being used by the signal processing unit 115 itself outputting a corresponding error signal 175. By way of the knowledge of the link value 140 used and the time interval 225 between two applications of the link value 140 in question, the sequence of measurement values 110 output by the digital part 180 of the sensor 120 can be analyzed and evaluated in a very simple manner.

In the exemplary embodiment shown in FIG. 2A, a second link parameter 220 is then used as the link value 140, which leaves the measurement value 110 substantially unmodified, such that, when considered in a purely technical sense, only the first link parameter 215 can be applied as the link value 140 to the measurement values 110 which are entered in the data field 210 of the first and third data words 205. The second measurement value 110 is not modified at all in this case. As a result, the processing in the device 100, specifically in the processing unit 130, can be simplified such that, for example, the numerical load for the specific conversion of the measurement values 110 into the varied measurement values 110' can be reduced. However, the result is that the measurement values 110 are actually "distorted" and thus need to be, or should be, corrected back again in the device 150 or a sub-unit of this device 150 in order to avoid any further errors when these measurement values 110 are used. This is necessary in particular when such processing of the measurement values 110 into the processed or varied measurement values 110' is carried out even if the read-in interface 125 receives not only statically adjoining measurement values 110 but also actual dynamically varying measurement values 110 which are converted in the processing unit 130 in accordance with the processing specification 135 to protect the transmission. Even if an evaluation is only carried out in a component of the device 100 such that the measurement values 110 read in via the read-in interface 125 remain the same and corresponding processing is carried out in accordance with the processing specification 135, this is not known on the receiving side of the signal processing unit 115, and therefore corresponding compensation of the conversion of the measurement values 110 into the varied measurement values 110', carried out in the processing unit 130, should always be performed for accordingly protecting the usability of the measurement values.

FIG. 2B is a view of a composition of the signal 105 using a further exemplary embodiment for the processing specification 135. In this case, different measurement values 110 are adopted: in this case, for example, the sequence of digital measurement values in the form 1101, 1010, and 1110. If, for example, a link value 140 which corresponds to an addition of a lowest-value digit is then selected as the first link parameter 215 and a link value 140 which corresponds to a subtraction of a lowest-value digit is selected as the second link parameter 220, a value of 1110 is obtained as the first varied measurement value 110', a value of 1001 is obtained as the second varied measurement value 110', and a value of 1111 is obtained as the third varied measurement value 110', which are then each entered in the relevant data field 110 of the data word 105 in question.

In this way, by alternately adding and subtracting a low value to and from the corresponding measurement value 110, the "distortion" caused by the processing specification 135 can be compensated for by averaging different link values 140, in particular when the measurement values have been observed for a longer period of time, for example for an integration of these measurement values, such that an evaluation of this kind in fact no longer requires correction of the varied measurement values 110' in the device 150 or the signal processing unit 115, meaning that numerical or circuitry-related complexity can be further reduced.

At the same time, it can be noted that, in principle, not only does a low value of the corresponding measurement values 110 need to be modified by the processing specification 135 in order to detect an error in the sensor 120 or digital part 180, but other digits in the measurement value 110 can also be actively modified as long as it is known which digit is used by the processing specification 135 or which link value 140 is used. Information regarding the cycle of the processing specification or the time interval 225 between the use of the different link parameters 215 and 225 as link values 140 is also relevant.

It is of course also possible for measurement values 110 having any resolution to be able to used for the approach presented here, meaning that the approach presented here is not limited only to 4-bit-wide measurement values. It is also apparent that, due to the approach presented here, it is thus no longer necessary to significantly increase the resolution of the measurement values in order to detect, by way of a sensor 120 that captures a noise of the physical value, that the digital part 180 of the sensor 120 is still functioning correctly. Instead, by actively modifying individual digits or components of the measurement values 110 in the knowledge of the exact modification specification or processing specification 130, it is possible to identify a potential malfunction of the sensor 120 or digital part 180 of the sensor 120 very effectively and technically very efficiently.

In summary, in view of the approach presented here, the question is when an above-described procedure of increasing the resolution to 32 bits is required. That procedure is only useful if the noise is supposed to be used to check whether the digital part 180 of the sensor 120 is still running. Since, in statistics, a plurality of consecutive equal values cannot be excluded, it is for example proposed in other approaches that the noise width be increased in order to significantly decrease the probability of consecutive equal values. However, in VMPS using 32 bits, more than twice the SPI bus load would be generated on the SPI, and this alone poses difficulties for the microprocessor. In addition, the radiation would increase in electromagnetic compatibility. This situation becomes even worse on a 500 kHz CAN bus. If the entire width of 8 bytes is required, a value of 200 ps for a data word 205 is obtained per signal. For 6 signals, this is already 1200 ps, or 2400 ps with redundancy. If an interval of 5 ms is selected, just the transmission of the sensor values generates a bus load of 50%.

According to the approach presented here, the data width can be reversed to 16 bits again and, for example, one bit of "artificial noise" can be added: this means, for example, that the old value is stored, and a new value is calculated, with an LSB then being subtracted or added in a statistically distributed manner. Therefore, a check as to whether the digital is still "alive" can only be performed by way of a comparison.

Figure 3:
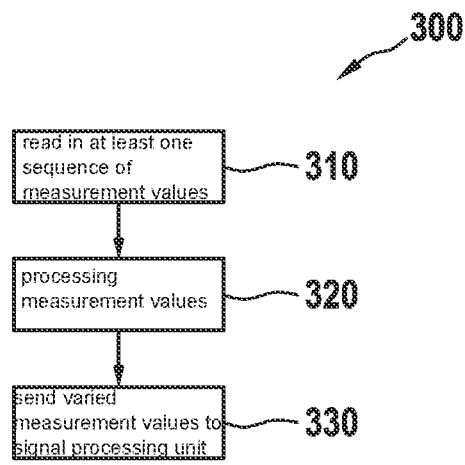
FIG. 3 is a flow diagram of an exemplary embodiment of a method 300 for protecting a signal for transmitting a sequence of measurement values to a signal processing unit.

FIG. 3 is a flow diagram of an exemplary embodiment of a method 300 for protecting a signal for transmitting a sequence of measurement values to a signal processing unit. The method 300 comprises a step 310 of reading in at least one sequence of measurement values from a sensor and a step 320 of processing the measurement values using a cyclical processing specification in order to determine a varied measurement value for each of at least two measurement values. Finally, the method 300 comprises a step 330 of sending the varied measurement values to the signal processing unit as measurement values from the sensor.

Figure 4:
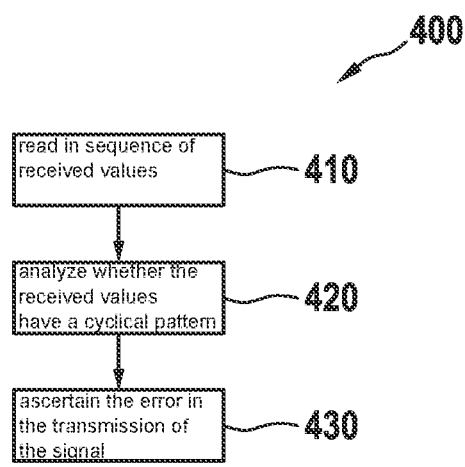
FIG. 4 is a flow diagram of an exemplary embodiment of a method 400 for detecting an error in the transmission of a signal containing measurement values to a signal processing unit.

FIG. 4 is a flow diagram of an exemplary embodiment of a method 400 for detecting an error in the transmission of a signal containing measurement values to a signal processing unit. The method 400 comprises a step 410 of reading in a sequence of received values from the transmission signal and a step 420 of analyzing whether the received values have a cyclical pattern as obtained by applying the processing specification to measurement values from a sensor. Finally, the method 400 comprises a step 430 of ascertaining the error in the transmission of the signal containing received values if it is not detected in the analyzing step that the signal containing received values has the cyclical pattern.

If an exemplary embodiment contains an "and/or" conjunction between a first feature and a second feature, this should be interpreted such that, according to one specific embodiment, the exemplary embodiment includes both the first feature and the second feature and, according to a further specific embodiment, the exemplary embodiment includes either only the first feature or only the second feature.

What is claimed is:

1. A method for protecting a signal for transmitting a sequence of measurement values to a signal processing unit, the method comprising the following steps:
   reading in at least one sequence of measurement values from a sensor;
   processing the measurement values using a cyclical processing specification to determine a varied measurement value for each measurement value of at least two of the measurement values; and
   sending the varied measurement values to the signal processing unit as measurement values from the sensor;
   wherein in the processing step, the processing specification is configured to alternately link measurement values to a first predefined link value and a second predefined link value that differs from the first predefined link value to determine the varied measurement values.

2. The method as recited in claim 1, wherein in the processing step, the processing specification used is configured to bring about an algebraic and/or logical link between the measurement value and/or a digital representation of the measurement value and a predefined link value to determine the varied measurement values.

3. The method as recited in claim 2, wherein in the processing step, the processing specification used is configured to add a measurement value to the predefined link value to determine a corresponding varied measurement value.

4. The method as recited in claim 2, wherein in the processing step, the processing specification used which is configured to modify a lowest-value digit of the measurement value in order to obtain a corresponding varied measurement value.

5. The method as recited in claim 2, wherein the measurement values are processed as binary datum and the processing specification modifies a digit of a digit having a lowest-valued value.

6. The method as recited in claim 5, wherein in the processing step, the processing specification used is configured to use a value that forms a value complementary to the first predefined link value as the second predefined link value.

7. The method as recited in claim 1, wherein in the processing step, the processing specification used which is configured to apply the cyclical processing specification when measurement values of the sequence of measurement values within a predefined time interval are identical.

8. The method as recited in claim 1, wherein in the processing step, the processing specification used which is configured to perform the processing cyclically using the processing specification for measurement values that are read in at a predefined time interval from one another in order to obtain one corresponding varied measurement value in each case.

9. A device configured to protect a signal for transmitting a sequence of measurement values to a signal processing unit, the device configured to:
   read in at least one sequence of measurement values from a sensor;
   process the measurement values using a cyclical processing specification to determine a varied measurement value for each measurement value of at least two of the measurement values; and
   send the varied measurement values to the signal processing unit as measurement values from the sensor;
   wherein in the processing, the processing specification is configured to alternately link measurement values to a first predefined link value and a second predefined link value that differs from the first predefined link value to determine the varied measurement values.

10. A non-transitory machine-readable storage medium on which is stored a computer program for protecting a signal for transmitting a sequence of measurement values to a signal processing unit, the computer program, when executed by a computer, causing the computer to perform the following steps:
    reading in at least one sequence of measurement values from a sensor;
    processing the measurement values using a cyclical processing specification to determine a varied measurement value for each measurement value of at least two of the measurement values; and
    sending the varied measurement values to the signal processing unit as measurement values from the sensor;
    wherein in the processing step, the processing specification is configured to alternately link measurement values to a first predefined link value and a second predefined link value that differs from the first predefined link value to determine the varied measurement values.

* * * * *